March 27, 1934. O. R. RONNEBERG 1,952,221

INNER TUBE FOR AUTOMOBILE TIRES

Filed Dec. 15, 1932

Inventor
OLAF R. RONNEBERG
By Paul, Paul & Moore
Attorneys

Patented Mar. 27, 1934

1,952,221

UNITED STATES PATENT OFFICE 1,952,221

INNER TUBE FOR AUTOMOBILE TIRES

Olaf R. Ronneberg, Minneapolis, Minn.

Application December 15, 1932, Serial No. 647,398

6 Claims. (Cl. 116—34)

This invention relates to improvements in inner tubes for automobile tires and has, among its objects, to provide means for delaying the collapse of a tire after a blowout, and to provide means for giving an audible and continuous signal during such delayed collapse.

It is well known that the sudden collapse of a tire due to a blowout, particularly when running at high speeds, is the cause of many serious accidents. By the use of this invention, such accidents can be largely avoided, because of the delayed collapse, and continuous audible signaling during such collapse. The invention is also useful for signaling that there is a puncture, when the puncture is a large one.

The present invention also provides an inner tube which can be cheaply manufactured, and in which resiliency is retained, due partly to the relatively thin wall thickness of the partitioning elements, and partly to the arrangement of said elements relative to the direction of collapsing force.

Features of the invention include all the details of construction, the specific arrangements of the partitioning means, the use of signaling means to indicate that collapse is taking place, the placement of this means entirely within the inner tube; the button-like whistle or signal structure which establishes communication between the compartments; the idea of buttoning the various sections together by a whistle structure to form the complete inner tube; the use of a single whistle structure, or of a plurality of whistle structures in each partition.

Objects, features and advantages of the invention will be set forth in the description of the drawing forming a part of this application, and in said drawing Figure 1 represents the cross-section of an outer casing of an automobile tire equipped with my improved inner casing composed of three circumferential tubular cross-sectionally segmental sections;

Figure 1:
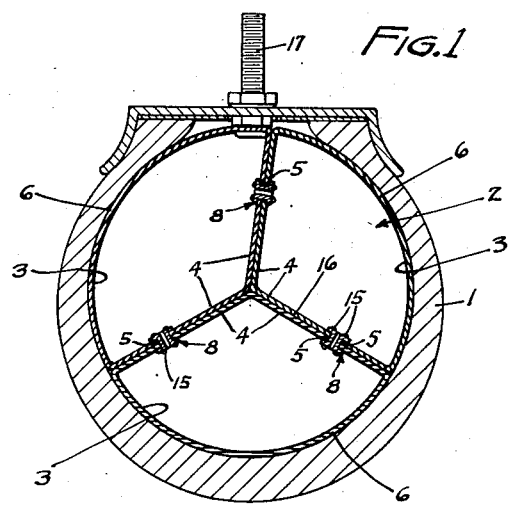
Figure 6:
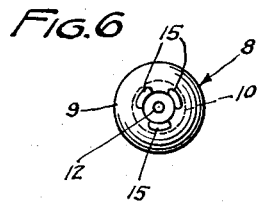
Figure 6 is an end view of the button structure showing the guard projections around the whistle opening.

In carrying out my invention, and first referring to Figure 1: Numeral 1 indicates the outer casing of an automobile tire. Numeral 2 generally indicates my improved inner tube preferably formed of three circular tubular sections cross-sectionally segmentally shaped to be fitted together to form a cross-sectionally circular tube, each section being indicated by numeral 3. These sections may be formed in any suitable manner, and each has straight wall portions 4, each portion being provided with at least one opening 5 for the reception of a button-like whistle structure generally indicated at 8, and comprising a comparatively thin spool-like structure including the flanges 9 connected by a tubular portion 10. In this tubular portion is provided a relatively large chamber or passage 11. The opposite ends of these passages are partially closed and are formed to provide what may be considered openings, the margins of which are defined by thin edges. The opening-forming edges are indicated at 12, and these edges have only been indicated in Figure 6 because of the small scale of the whistle elements in the other figures. It is noted that mere openings through the partition will not serve the signaling or whistling function, but true whistle structures must be used to obtain signal effects which will be audible to the driver or occupants of the automobile.

A plurality of audible signaling means, operable during collapse of the tire, may be used in each partition. The use of such signal means in a button structure in an inner tube in the manner shown is claimed.

On the outer faces of the flanges of the button or whistle member 8, and only partially circumscribing each opening 12 are segmental projections 15 for the purpose of preventing closure of the openings 12 by the walls of the tubes when collapse of the tire takes place, and when the partition walls are pressed against themselves or the outer wall portions of the inner tube, as a result of a blowout or puncture of any one of its chambers.

In assembly, the tire sections 3 are secured together by passing the elements 8 through the openings 5 in the manner of buttons to secure the walls 4 together, said walls being thereafter cemented or vulcanized together. The reference numeral 16 indicates the position of the vulcanizing material or cement, not shown.

A feature of the invention is the use of two or more chamber-forming sections and the formation of two-ply partitions by superposition of portions 4 of the tubular segments to increase the thickness of the partitions, in some instances doubling the thickness over that of the peripheral or curved portion 6 of the section 3. It is noted that the sections are so formed that the upper or vertical or inner vertical partition is off-set from a vertical line passing through the center of the tire. This is for the purpose of attaching the valve structure indicated at 17.

Figure 2:
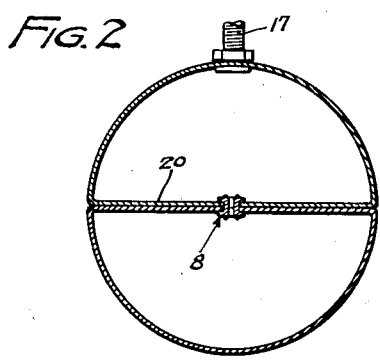
Figure 2 is a cross-section of a modification in which a single horizontally arranged partition only is provided.

In Figure 2, a single horizontally arranged partition 20 is provided. This represents the simplest form of the invention, preferably only a single button or signal element being arranged in the partition, but there is no intention to limit the invention in this manner because a plurality of such signal means may be circumferentially arranged, and such an arrangement is in fact desirable in certain cases.

Figure 3:
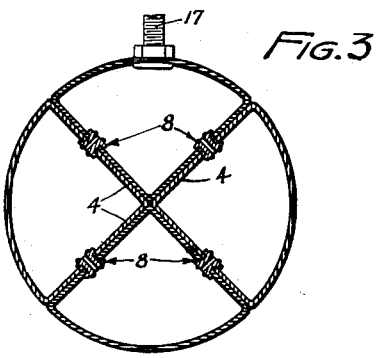
Figure 3 is a cross-section showing a modification in which partitions are arranged at an angle of ninety degrees to one another and at an angle of forty-five degrees to a vertical line passing through the axis of the tube when the tube is in operative position.
Figure 4:
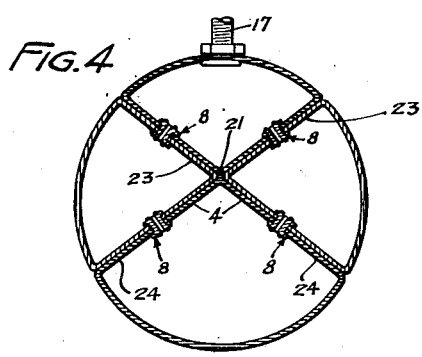
Figure 4 is another modification somewhat similar to Figure 3 in which the crossing point of the partitions lies above the circumferential axis of the tube.
Figure 5:
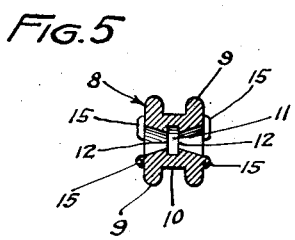
Figure 5 is a detail longitudinal section of the whistle and buttoning structure.

In Figure 3, the partitions have been arranged at an angle of ninety degrees to one another and at an angle of forty-five degrees with a vertical line passing through the axis of the tube when said tube is operatively positioned. In Figure 4, the angular relations are slightly different and the crossing point 21 of the partitions lies above the axis 22 of the tube, so that the partition elements 23 are slightly shorter than the partition elements 24. This makes the bottom-most chamber the larger of the four. By this arrangement, the resiliency of the circumferential wall of the bottom-most tubular element is retained to a greater degree than in the form shown in Figure 3.

Figure 7:
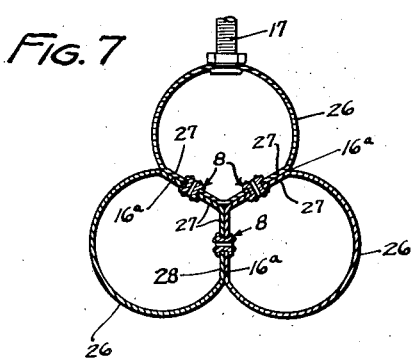
Figure 7 is a transverse section showing a modification of an inner tube composed of three initially circularly cross-sectional tubes slightly flattened at their meeting portions and buttoned together by my improved whistle means.

Figure 7 shows a modification in which the tube is originally formed from three cross-sectionally circular sections, each of which is generally indicated at 26. During the buttoning or connecting operation of these sections, they are flattened as at 27 so that each section has two flattened portions 27. Cement or vulcanization is applied as at 16 and this is extended for a short distance outwardly beyond the button, as indicated at 16ª. In this form of the invention, there is a vertically arranged partition 28 extending upwardly from the bottom of the tube.

In some instances, the partition-forming portion or portions of each tube are thinner than the arcuate portions so that when two portions 4, or their equivalents, are connected the combined thicknesses are substantially equal to the thickness of the arcuate portion. This makes for flexibility and modifies the action during collapse. Assuming the tire to have three circumferential sections and thirty pounds pressure; after a blow-out in any one chamber the remaining two chambers will furnish sufficient pressure to operate the buttoning whistles and also will furnish sufficient air to properly delay collapse.

As before mentioned, there may be a series of whistles arranged circumferentially, so whatever the circumferential position of the blowout, at least one whistle will be near the blowout opening to be heard therethrough.

In the forms of the invention shown in Figures 3 and 4, two diametrically arranged partitions are used.

When a blowout occurs, the partitions are suddenly stretched and moved, by the pressure in the remaining chambers, toward the chamber in which the blowout has occurred, and at least one of the partition walls moves against the inner surface of the wall of that chamber to partly close the blowout opening. Both during and after such movement, until collapse is complete, the signal is sounding.

With this invention, if one is driving a vehicle at sixty miles per hour, and a blowout occurs, instead of the sudden collapse and uncontrollable action of the car, the tire remains inflated for a sufficient length of time to allow the driver to slow down enough to avoid accident. The size of the whistle openings, or the sizes of the openings and the number of whistles, govern the delayed time of collapse. The openings are so proportioned that a sufficiently loud signal is always had, but so that deflation is delayed the proper length of time to allow the driver to stop before deflation is complete.

I claim as my invention:

1. An inner tube for an automobile tire comprising a plurality of tubular sections having walls cooperating to provide a plurality of double-ply partitioning means, whistle structures buttoning said walls together, and establishing air communication between the sections, said partitioning means being angularly related in a manner to dispose the largest section nearest to the tread portion of the tire when the tube is operatively positioned therein.

2. An inner tube for an automobile tire comprising a plurality of initially cross-sectionally circular chamber-forming rings having walls cooperating to form a plurality of double ply radial partitions, and whistle structures buttoning said partition walls together and establishing air communication between the chambers.

3. An inner tube for an automobile tire comprising three tubular annuli which are pressed together to flatten their walls, and structures securing the flattened wall portions together, each structure having an opening establishing air communication between the corresponding annuli, each opening being formed to obtain a whistle signal when air is blown therethrough as a result of collapse of any tubular annulus.

4. An inner tube for an automobile tire comprising a plurality of tubular sections having walls cooperating to provide a two ply partition, and a signaling whistle structure buttoning said walls together and establishing air communication between the sections, said whistle structure including a central chamber and passages leading thereto from each of two adjacent sections and intersecting the chamber to provide thin edges across which the air is blown to produce the signal.

5. An inner tube for an automobile tire comprising a plurality of tubular sections having walls cooperating to provide double-ply partitioning means, and a whistle structure including means buttoning said walls together, said structure establishing communication between the sections.

6. An inner tube for an automobile tire comprising two tubular sections having walls cooperating to provide a two-ply partition normally arranged to take a position concentric with and parallel to the tread portion of the outer tire casing, and a whistle structure including means buttoning said walls together, said structure establishing communication between the sections.

OLAF R. RONNEBERG.